US011445267B1

(12) United States Patent
Hori et al.

(10) Patent No.: US 11,445,267 B1
(45) Date of Patent: Sep. 13, 2022

(54) LOW-LATENCY CAPTIONING SYSTEM

(71) Applicant: Mitsubishi Electric Research Laboratories, Inc., Cambridge, MA (US)

(72) Inventors: Chiori Hori, Lexington, MA (US); Takaaki Hori, Lexington, MA (US); Anoop Cherian, Belmont, MA (US); Tim Marks, Newton, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/384,234

(22) Filed: Jul. 23, 2021

(51) Int. Cl.
*H04N 21/488* (2011.01)
*H04N 21/44* (2011.01)
*G06V 20/40* (2022.01)

(52) U.S. Cl.
CPC ......... *H04N 21/4884* (2013.01); *G06V 20/41* (2022.01); *H04N 21/44008* (2013.01)

(58) Field of Classification Search
CPC ......... H04N 21/4884; H04N 21/44008; G06V 20/41
See application file for complete search history.

(56) References Cited

U.S. PATENT DOCUMENTS

| 10,417,498 | B2   | 9/2019 | Hori et al. |
| 11,270,160 | B2 * | 3/2022 | Jiang ................... G06V 10/454 |
| 2022/0070537 | A1 * | 3/2022 | Younessian ........ H04N 21/4821 |

\* cited by examiner

*Primary Examiner* — Nnenna N Ekpo
(74) *Attorney, Agent, or Firm* — Gennadiy Vinokur (57) ABSTRACT

A scene captioning system is provided. The scene captioning system includes an interface configured to acquire a stream of scene data signals including frames and sound data, a memory to store a computer-executable scene captioning model including a scene encoder, a timing decoder, a timing detector, and a caption decoder, wherein the audio-visual encoder is shared by the timing decoder and the timing detector and the caption decoder, and a processor, in connection with the memory. The processor is configured to perform steps of extracting scene features from the scene data signals by use of the audio-visual encoder, determining a timing of generating a caption by use of the timing detector, wherein the timing is arranged an early stage of the stream of scene data signals, and generating the caption based on the scene features by using the caption decoder according to the timing.

18 Claims, 5 Drawing Sheets

| Method | Latency ratio | METEOR |
|---|---|---|
| Baseline | 100% | 10.67 |
| Naïve method | 55% | 10.20 |
| This invention | 56% | 10.38 |
| This invention w/ ST | 55% | 10.45 |
| Naïve method | 33% | 9.59 |
| This invention | 29% | 9.93 |
| This invention w/ ST | 28% | 10.00 |

FIG. 5

LOW-LATENCY CAPTIONING SYSTEM

TECHNICAL FIELD

This invention relates generally to scene captioning and scene captioning based interaction more particularly to end-to-end scene captioning that utilizes a latency optimization function.

BACKGROUND

At any time instant, countless events that happen in the real world are captured by sensors such as cameras, microphoens, LiDAR, mmWave and stored as massive sensor data resources. To effectively retrieve such recordings, whether in offline or online settings, scene captioning is an essential technology thanks to its ability to understand scenes and describe events in natural language. Furthermore, robots can interact with humans or other robots to decide next actions based on scene understanding through online scene captioning.

Scene captioning technology has been actively researched in the field of computer vision for video captioning. A deep recurrent neural network (RNN) has been applied to video captioning, where an RNN is trained to convert a sequence of image features extracted from a video clip to a sequence of words that describes the video content. Its goal is to generate a video description (caption) about objects and events in any video clip. Recently, a Transformer model is getting more popular than RNNs as a model for video captioning, since it improves the captioning performance.

Moreover, not only image features but also audio features have been extracted from video clips and utilized to improve the caption quality, where an attention-based multimodal fusion technique has been introduced to effectively fuse the image and audio features according to the video content [U.S. Pat. No. 10,417,498].

Prior methods for video captioning are basically assumed to work in an offline manner, where each video clip is given before captioning, and therefore the system can access all frames of the video clip to generate the caption. However, such prior methods are not practical in real-time monitoring, surveillance systems, scene-understanding based interaction systems for car navigation and robots, in which it is essential not only to describe events accurately but also to produce captions as soon as possible to find and report the events quickly to take next actions. Thus, low-latency captioning for online systems is required to realize such functionality, where the system needs to decide an appropriate timing to generate a correct caption using only the limited number of frames the system has received so far. Additionally, such a low-latency captioning function allow robots to decide next actions as soon as possible to interact with humans and other robots.

SUMMARY

Some embodiments of the present disclosure are based on recognition that scene captioning is an essential technology to understand scenes and describe events in natural language. To apply it to real-time monitoring systems, the systems require not only to describe events accurately but also to produce the captions as soon as possible. Low-latency captioning is needed to realize such functionality, but this research area for online scene captioning has not been pursued yet. This paper proposes a novel approach to optimize each caption's output timing based on a trade-off between latency and caption quality. An audio-visual Transformer is trained to generate ground-truth captions using only a small portion of all scenes, and to mimic outputs of a pre-trained Transformer to which all the scenes are given. A CNN-based timing detector is also trained to detect a proper output timing, where the captions generated by the two Transformers become sufficiently close to each other. With the jointly trained Transformer and timing detector, a caption can be generated in the early stages of an event, as soon as an event happens or when it can be forecasted.

An object of some embodiments of the invention is to provide a system and a method for end-to-end scene captioning capable for online/offline surveillance system and scene-aware interaction to understand the events using natural language as soon the system recognizes the events as possible.

This disclosure includes a low-latency scene captioning system, which is trained to optimize the output timing for each caption based on a trade-off between latency and caption quality. The present invention may train a low-latency caption generator according to the following strategy: (1) generate groundtruth captions using a low-latency caption generator that only sees a small portion of all scenes acquired by sensors or a small portion of all signals; (2) mimic outputs of a pre-trained caption generator, where the outputs are generated using the entire scene; and (3) train a timing detector that finds the best timing to output a caption, such that the caption ultimately generated by the low-latency caption generator becomes sufficiently close to its groundtruth caption or the caption generated by the pre-trained caption generator using the entire scene. The low-latency caption generator based on (1) and (2) and the timing detector of (3) are jointly trained.

The jointly trained low-latency caption generator and timing detector can generate captions in an early stage of scene acquired by sensors, as soon as an event happens. Additionally, this framework can be applied to forecast future events in low-latency captioning. Furthermore, by combining multimodal sensing information, an event can be recognized at an earlier timing triggered by the earliest cue in one of modalities without waiting for other cues in other modalities. In particular, an audio-visual Transformer built as a low-latency caption generator according to embodiments of the present invention can be used to generate captions earlier than a visual cue's timing based on the timing of an audio cue. Such a low-latency video captioning system using multimodal sensing information can contribute not only to retrieving events quickly but also to respond scenes earlier.

Some embodiments are based on recognition that experiments with the ActivityNet Captions dataset show that a system based on the present invention achieves 94% of the caption quality of the upper bound given by the pre-trained Transformer using the entire video clips, using only 28% of frames from the beginning.

According to some embodiments of the present invention, a scene captioning system can be provided. In this case, the scene captioning system may include an interface configured to acquire a stream of signals captured by multimodal sensors to caption scenes; a memory to store a computer-executable scene captioning model including a multimodal sensor feature extractor, a multimodal sensor feature encoder, a timing detector, and a scene caption decoder, wherein the multimodal sensor feature encoder is shared by the timing detector and the scene caption decoder; a processor, in connection with the memory, configured to perform steps of: extracting multimodal sensor features from the multimodal sensor signals by use of the multimodal sensor feature extractor; encoding multimodal sensor features by use of the multimodal sensor feature encoder; determining a timing of generating a scene caption by use of the timing detector, wherein the timing is arranged an early stage of the stream of multimodal sensor signals; and generating the scene caption describing events based on the multimodal sensor features by using the scene caption decoder according to the timing.

Further, some embodiments of the present invention are based on recognition that a computer-executable training method is provided for training a multimodal sensor feature encoder, a timing detector, and a scene caption decoder. The method may include providing a training dataset that includes a set of multimodal sensor signals and a set of groundtruth scene captions; converting the multimodal sensor signals to a feature vector sequence using a feature extractor; eliminating future frames from the feature vector sequence using a future frame eliminator, wherein the future frame eliminator takes first feature vectors from the feature vector sequence and removes other feature vectors to generates a future-eliminated feature vector sequence; encoding the future-eliminated feature vector sequence to a hidden activation vector sequence; training the low-latency scene caption generator by computing a loss value; computing a loss value based on a posterior probability distribution and the groundtruth captions; training the timing detector by computing a supervision signal based on a scene caption similarity between a scene caption for the future-eliminated feature vector sequence and the groundtruth caption.

Yet further, when the scene captioning system is configured as a video captioning system, the video captioning system may include an interface configured to acquire a stream of audio-visual signals including image and sound data; a memory to store a computer-executable video captioning model including an audio-visual feature extractor, an audio-visual feature encoder, a timing detector, and a video caption decoder, wherein the audio-visual encoder is shared by the timing decoder and the timing detector and the video caption decoder; a processor, in connection with the memory, configured to perform steps of: extracting audio and visual features from the audio-visual signals by use of the audio-visual extractor; encoding audio and visual features from the audio-visual signals by use of the audio-visual encoder; determining a timing of generating a video caption by use of the timing detector, wherein the timing is arranged an early stage of the stream audio-visual signals; and generating the video caption describing audio-visual scenes based on the audio and visual features by using the video caption decoder according to the timing.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Modules and networks exemplified in the present disclosure may be computer programs, software or instruction codes, which can execute instructions using one or more processors. Modules and networks may be stored in one or more storage devices or otherwise stored into computer readable media such as storage media, computer storage media, or data storage devices (removable and/or non-removable) such as, for example, magnetic disks, optical disks, or tape, in which the computer readable media are accessible from the one or more processors to execute the instructions.

Computer storage media may include volatile and non-volatile, removable and non-removable media implemented in any method or technology for storage of information, such as computer readable instructions, data structures, program modules, or other data. Computer storage media may be RAM, ROM, EEPROM or flash memory, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both using one or more processors. Any such computer storage media may be part of the device or accessible or connectable thereto. Any application or module herein described may be implemented using computer readable/executable instructions that may be stored or otherwise held by such computer readable media.

Low-Latency Captioning

According to some embodiments of the present disclosure, a scene captioning system can provide low-latency scene captioning to understand scenes and describe events in natural language from real-time monitoring of scenes or online/offline scene streaming.

In some cases, the scene captioning system can be configured as a video captioning system, and the video captioning system may be referred to as a low-latency video captioning method/system.

In the following, a low-latency video captioning method/system is provided as an example descriptions of the low-latency scene captioning method/system.

For instance, a stream of signals obtained by unimodal or multimodal sensors can be translated into captions using natural language. Unimodal is included by multimodal when a single sensor is applied. The multimodal sensors capture information such as visual image, audio signals, 3D-localization, thermography, Wi-Fi and so on. In some cases, the sensors may be image sensors, microphone, audio-visual signal sensors, LiDAR, mmWave, thermo-sensor, smell-sensor, tactile-sensor or any combinations thereof.

When the low-latency scene captioning method/system is applied to realtime or offline video streams, multimodal sensor signals may be a stream of audio-video signal, a scene encoder may be an audio-visual encoder, unimodal/multimodal sensor features may be audio and visual features. Further, multimodal sensor signals may be signals/information acquired by multimodal sensors. For instance, the signals can be any of sensing information such as video frames, sound data, 3-D localization data, thermo sensor data, smell sensor data, tactile sensor data or any combinations thereof.

Figure 1:
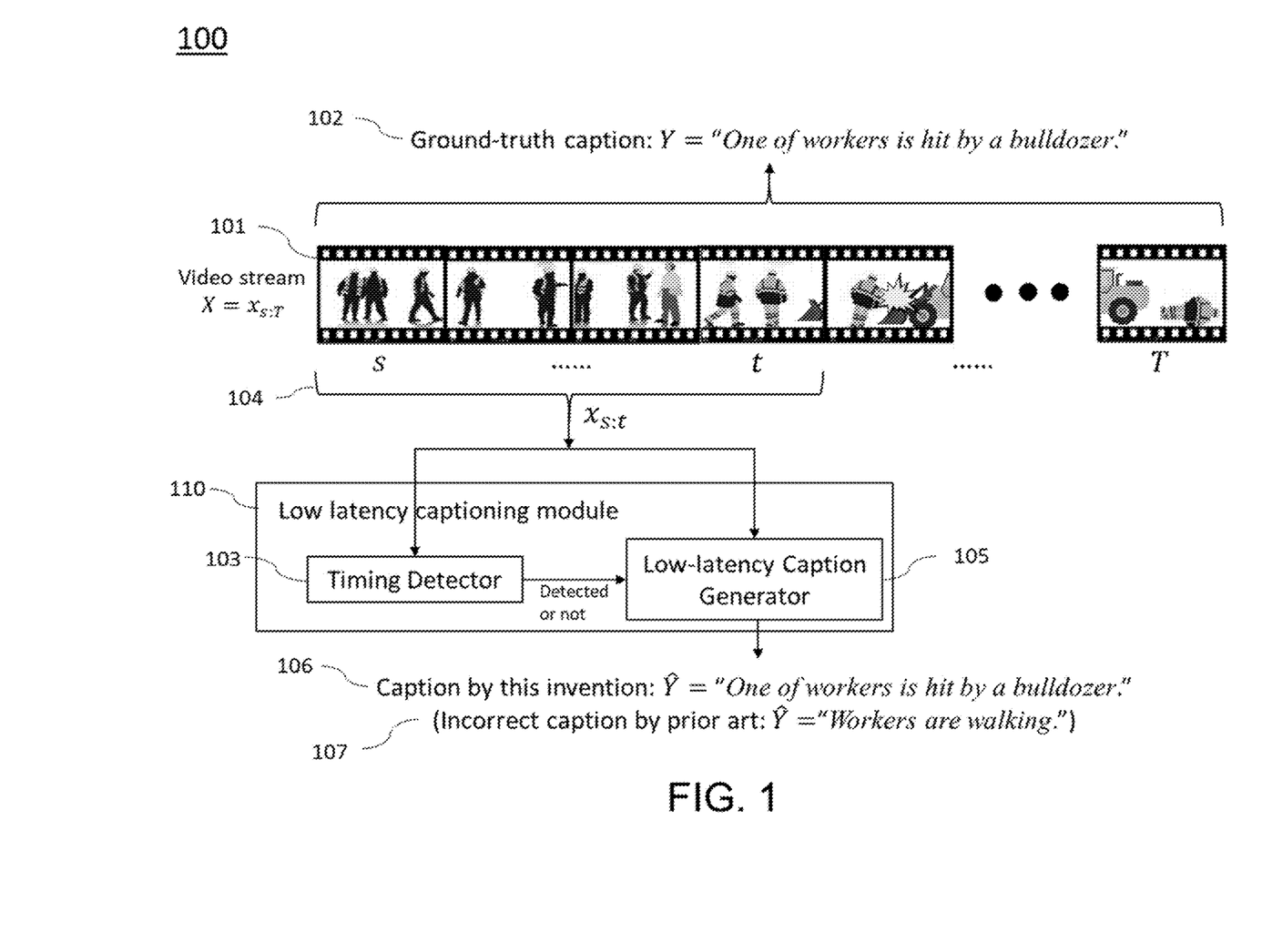
FIG. 1 is a schematic diagram illustrating a process of low-latency video captioning, according to embodiments of the present invention.

FIG. 1 is a schematic diagram illustrating a process of low-latency video captioning, according to embodiments of the present invention. Suppose a video stream 101 is given as X, in which an event has occurred between time s and time T, where a groundtruth caption 102 as Y may be "One of workers is hit by a bulldozer" for the event. The caption is typically a sentence that explains the event in natural language. Video captioning systems based on prior art generate such a caption for a video clip using the entire frames $x_{s:T}$ of the video stream X, where $x_{s:T}$ denotes a sequence of video frames $x_s, x_{s+1}, \ldots, x_{T-1}, x_T$, each of which corresponds to a video frame for each time index. Therefore, such prior video captioning systems are assumed to work only in an offline manner.

However, such prior methods are not practical in real-time monitoring or surveillance systems, in which it is essential not only to describe events accurately but also to produce captions as soon as possible. To this end, a low-latency video captioning module 110 needs to have a timing detector 103 that decides if the current time t is an appropriate timing to output a caption, using partial video frames 104, i.e., $x_{s:t}$ the video frames from the beginning time s to the current time t. Only if the timing detector 103 detects the appropriate timing, a low-latency caption generator 105 generates a caption 106 based on the partial video frames 104. The beginning time s may be decided based on a timing the system generated the previous caption or a timing a certain change on pixel intensities in the video is detected (not shown in FIG. 1).

One remaining problem is that there is no sufficient dataset to train the timing detector 103 and the low-latency caption generator 105, where the dataset should be annotated with appropriately early timings and their captions for various videos. There exist datasets only for offline video captioning, i.e., the datasets were annotated with timings where the events have already finished in the video. In general, correcting a large amount of new dataset with such early timing annotations is very expensive.

To solve this problem, embodiments of the present invention train the timing detector 103 and the low-latency caption generator 105 using only datasets for offline video captioning, where the detector and the generator are optimized not only to describe events accurately but also to produce captions as soon as possible. Thus, low-latency video captioning is realized by detecting an appropriate timing to generate a correct caption using only the partial video frames 104 until the current time t. The system may generate a caption 106, which is equal to the groundtruth 102 "One of workers is hit by a bulldozer" even though it uses only partial video frames 104. On the other hand, prior methods that train the generator for offline video captioning may generate an incorrect caption 107 as "Workers are walking" for the partial video frames 104, because the generator is trained to generate a caption about an event occurred in each video clip. In the example of low-latency video captioning 100, the event "One of workers is hit by a bulldozer" has not yet occurred at time t. Therefore, it is difficult for systems based on prior art to generate the correct caption, while systems based on the present invention potentially generate the correct caption since the generator is trained to utilize some signs on future events in the partial video frames to generate correct captions.

Low-Latency Captioning Based Interaction System

Figure 2:
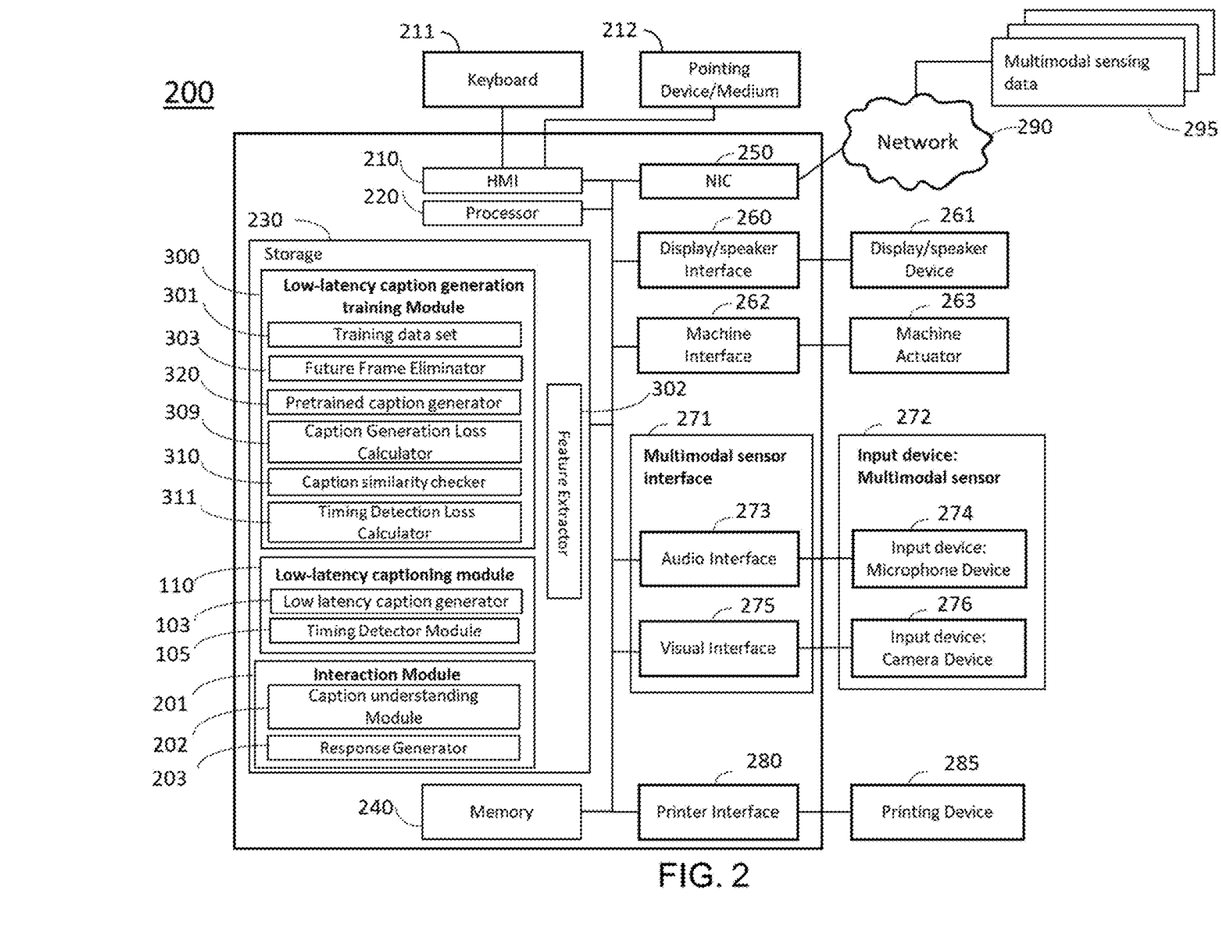
FIG. 2 is a block diagram illustrating a low-latency video captioning system including a low-latency caption generator, a pre-trained caption generator, and a timing detector, according to embodiments of the present invention.

FIG. 2 is a block diagram illustrating a low-latency video captioning system 200 including a low-latency caption generation training module 300 consisting of a training data set 301, a feature extractor 302, a future frame eliminator 303, a pre-trained caption generator 320, a caption generation loss calculator 309, a caption similarity checker 310 and a timing detection loss calculator 311, a low-latency captioning module 110 consisting of a timing detector module 103 and a low latency caption generator 105, interaction module 201 consisting of a caption understanding module 202 and a response generator 203 and, according to embodiments of the present invention;

The low-latency video captioning system 200 includes a human machine interface (HMI) 210 connectable with a keyboard 211 and a pointing device/medium 212, one or more processor 220, a memory 240, a network interface controller 250 (NIC) connectable with a network 290 including local area networks and internet network, a display and/or speaker interface 260 connectable with a display and/or speaker device 261, a machine interface 262 connectable with a machine actuator 263, an multimodal sensor interface 271 such as an audio interface 273 and a visual interface 275 connectable with input devices including multimodal sensors 272 such as a microphone device 274 and a camera device 276 respectively, a printer interface 280 connectable with a printing device 285. The memory 240 may be one or more memory units. The low-latency video captioning-based interaction system 200 can receive multimodal sensing data 295 via the network 290 connected to the NIC 250. The storage device 230 includes a feature extractor 302, a low-latency caption generation training module 300, a low latency captioning module 110 and an interaction module 201. In some cases, the feature extractor 302 may be configured as a multimodal sensor feature extractor 302 when the system is configured as a scene captioning system. Further the feature extractor 302 may be configured as an audio-visual feature extractor 302 when the system is configured as a video captioning system.

For performing the low-latency captioning, instructions may be transmitted to the low-latency video captioning system 200 using the keyboard 211, the pointing device/medium 212 or via the network 290 connected to other computers (not shown in the figure). The system 200 receives instructions via the HMI 210 and executes the instructions for performing low-latency video captioning using the processor 220 in connection with the memory 240 by loading the low-latency captioning module 110.

The low-latency video captioning module 110 outputs a token sequence as captioning result for a given multimodal sensing feature sequence obtained by feature extractor 302, and sends the token sequence to the display/speaker device 265 via the display/speaker interface 260, the printer device 285 via the printer interface 280, or other computers (not shown in the figure) via the network 290. Each token in the token sequence may be a single word, a single letter, a single character, or a word piece in a text form.

Training Procedure for Low-Latency Video Captioning System

Figure 3:
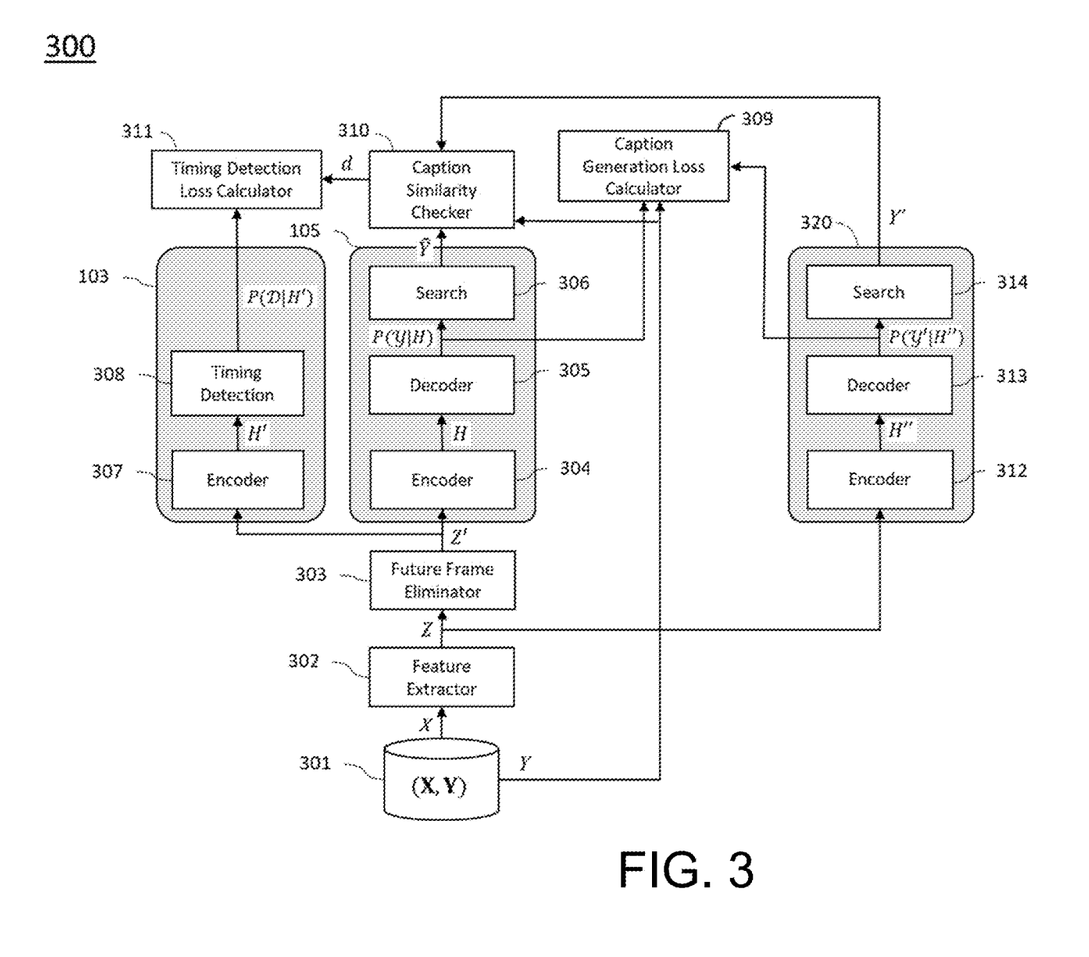
FIG. 3 is a block diagram illustrating a training procedure for a low-latency caption generator and a timing detector, which exploits a pre-trained caption generator to jointly optimize the low-latency caption generator and the timing detector, according to embodiments of the present invention.

FIG. 3 is a block diagram illustrating a training module 300 included in a low-latency video captioning system 200 including a low latency captioning module 110, which exploits a pre-trained caption generator 320 to jointly optimize the low-latency caption generator 103 and the timing detector 105, according to embodiments of the present invention.

Given a training dataset 301 including a set of video clips X and a set of groundtruth captions Y, wherein each video clip X in X is associated with its groundtruth caption Y in Y, first a feature extractor 302 converts the video clip X to a feature vector sequence Z for the video clip X. Then, a future frame eliminator 303 eliminates future frames from Z to simulate a situation of low-latency video captioning, where the future frames are not available. The future frame eliminator 303 takes the first K feature vectors of Z, removes the rest, and generates a future-eliminated feature vector sequence Z', where K may be determined randomly from $1 \leq K \leq |Z|$ ($|Z|$ denotes the length of Z).

The low-latency caption generator 105 may include an encoder 304, a decoder 305, and a search module 306, wherein the encoder 304 encodes the future-eliminated feature vector sequence Z' to a hidden activation vector sequence H, the decoder 305 estimates a posterior probability distribution $P(\mathcal{Y}|H)$ over a random variable $\mathcal{Y}$ of captions for H, and the search module 306 searches for the best caption $\hat{Y}$ such that $$\hat{Y} = \underset{y \in \mathcal{V}^*}{\mathrm{argmax}} P(y = y|H),$$

where $\mathcal{V}^*$ indicates a set of all possible word sequences based on a predefined vocabulary $\mathcal{V}$..

The timing detector 103 may include an encoder 307 and a timing detection module 308, wherein the encoder 307 encodes the future-eliminated feature vector sequence Z' to a hidden activation vector sequence H'. The timing detector 103 may use the encoder 304 of the low-latency caption generator 105 instead of the encoder 307. In this case, the timing detector 103 may not have the encoder 307, and may receive the output of the encoder 304, i.e., H' may be obtained as H'=H.

The timing detection module 308 estimates a detection probability distribution $P(\mathcal{D}|H')$ over a random variable $\mathcal{D}$ indicating whether the current timing is appropriate or not based on H'. The random variable $\mathcal{D}$ may take 0 or 1, where 0 indicates that the current timing is inappropriate while 1 indicates that the current timing is appropriate. In low-latency video captioning 100, the timing detector 103 may detect the appropriate timing when $P(\mathcal{D}=1|H')>F$, where F is a pre-determined threshold such that $0 \leq F < 1$.

To train the low-latency caption generator 105, a caption generation loss calculator 309 may compute a loss value based on the posterior probability distribution $P(\mathcal{Y}|H)$ and the groundtruth caption Y. The loss value may be computed as a cross-entropy loss;

$$\mathcal{L}_{CE} = -\log P(\mathcal{Y}=Y|H)$$

If the encoder 304 and the decoder 305 are designed as differentiable functions such as neural networks, the parameters of the neural networks can be trained to minimize the cross-entropy loss using the back-propagation algorithm. Minimizing the cross-entropy loss means letting the low-latency caption generator 105 generate appropriate captions as close as possible to the groundtruth captions. Further, when the system is configured as a scene captioning system, the encoder 304 may be configured as a multimodal sensor feature encoder 304. When the system is configured as video captioning system, the encoder 304 may be configured as an audio-visual feature encoder 304.

To train the timing detector 103, it needs a supervision signal on whether the current timing is appropriate or not. However, such kinds of signals are not included in the training dataset 301. Some embodiments of the present invention may have a caption similarity checker 310 to determine the appropriate timing based on the caption similarity between the generated caption $\hat{Y}$ and the groundtruth caption Y. This is based on an idea that the appropriate timing is a timing when the low-latency caption generator can generate a caption $\hat{Y}$ for the future-eliminated feature vector sequence Z', which is sufficiently close to the groundtruth caption Y. The caption similarity may be computed based on any sequence similarity measures such as Word accuracy, BLEU score, and METEOR score defined between the word sequences of the two captions.

The supervision signal d may be computed as $$d = \begin{cases} 1 & \text{if } Sim(\hat{Y}, Y) > S, \\ 0 & \text{otherwise} \end{cases}$$

where $Sim(\hat{Y}, Y)$ is a similarity measure between $\hat{Y}$ and $Y$, and S is a predefined threshold such that $0 \leq S < 1$.

Based on the supervision d and the detection probability distribution $P(\mathcal{D}|H')$ estimated by the timing detection module 308, a binary cross-entropy loss can be computed as $$\mathcal{L}_{BCE} = -\log P(\mathcal{D}=d|H')$$

As well as the low-latency caption generator 105, the timing detector 103 can be trained using the back-propagation algorithm if the encoder 307 and the timing detection module 308 are designed as differentiable functions such as neural networks.

In some embodiments of the present invention, the training procedure 300 for a low-latency video captioning system 200 may also include a pre-trained caption generator 203 to improve the performance of the low-latency video captioning system 200. The pre-trained caption generator 203 may include an encoder 312, a decoder 313, and a search module 314, which have already been trained using the training dataset 301 to minimize the loss function $$\mathcal{L}'_{CE} = -\log P(\mathcal{Y}=Y|H'')$$

where H" may be generated by the encoder 312 from the feature vector sequence Z, which are not eliminated. The generated caption Y' obtained as $$Y' = \underset{y \in \mathcal{V}^*}{\mathrm{argmax}} P(y = y|H''),$$

is expected to be closer to the groundtruth caption Y than the low-latency caption $\hat{Y}$ because the pre-trained caption generator 203 can use sufficient video frames (without future frame elimination) to generate captions unlike the low-latency caption generator 105.

Similarly, the estimated posterior probability distribution $P(\mathcal{Y}|H'')$ is expected to be better than $P(\mathcal{Y}|H)$ to generate correct captions.

With the pre-trained caption generator 203, the caption generation loss calculator 310 may use a Kullback-Leibler (KL) divergence loss as $$\mathcal{L}_{KL} = -\sum_{y \in \mathcal{V}^*} P(y = y|H'') \log P(y = y|H)$$

where the loss value $\mathcal{L}_{KL}$ is computed as a KL divergence that indicates the similarity between two probability distributions. Minimizing the KL divergence means training the low-latency caption generator 105 to mimic the pre-trained caption generator 203, where the low-latency caption generator 105 can use only the future-eliminated feature vector sequence Z' while the pre-trained caption generator 203 can use the entire feature vector sequence Z. More specifically, the training is performed to let the low-latency caption generator 105 estimate the posterior probability distribution $P(\mathcal{Y}|H)$ as close as possible to the posterior probability distribution $P(\mathcal{Y}|H'')$ estimated by the pre-trained caption generator 203 using the entire video frames. This framework potentially avoids overfitting the parameters of the low-latency caption generator 105 to the groundtruth caption Y.

A linear combination of the cross-entropy loss $\mathcal{L}_{CE}$ and the KL divergence loss $\mathcal{L}_{KL}$ may also be used to train the low-latency caption generator 105 as $$\mathcal{L}_{conv} = \lambda \mathcal{L}_{CE} + (1-\lambda) \mathcal{L}_{KL}$$

where $\lambda$ is a pre-defined scaling factor to balance the two losses.

With the pre-trained caption generator 203, the caption similarity checker 310 may compute the supervision signal d as $$d = \begin{cases} 1 & \text{if } \max(Sim(\hat{Y}, Y), Sim(Y', Y)) > S, \\ 0 & \text{otherwise,} \end{cases}$$

This mechanism encourages the timing detector 103 to detect the timing when the low-latency caption generator 105 can generate a caption not only close to the groundtruth caption Y but also to the caption Y' generated by the pre-trained caption generator 203 for the entire feature vector sequence Z. This also avoids the supervision for the timing detector 103 relys only on the similarity to the groundtruth caption Y, which hopefully improves the robustness of the timing detector 103.

Some Embodiments Based on Audio-Visual Transformer

Figure 4:
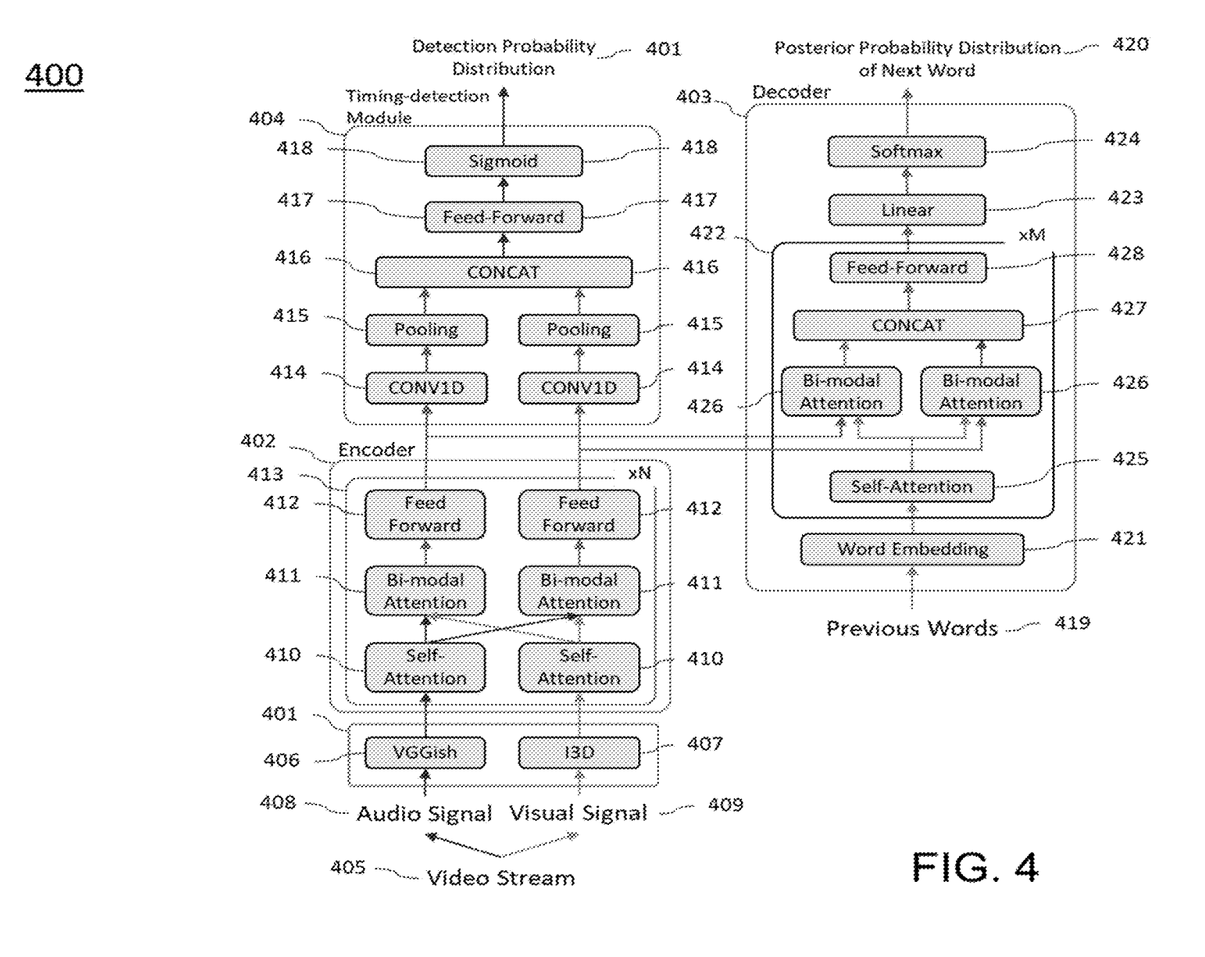
FIG. 4 is a schematic diagram illustrating an audio-visual Transformer built as a low-latency caption generator combined with a timing detector for low-latency video captioning, according to embodiments of the present invention.

FIG. 4 is a schematic diagram illustrating an audio-visual Transformer 400 built as a low-latency caption generator combined with a timing detector for low-latency video captioning, according to embodiments of the present invention. The audio-visual Transformer 400 for low-latency video captioning includes a feature extractor 401, an encoder 402, a decoder 403, and a timing detection module 404.

Given a video stream 405, the feature extractor 401 extracts VGGish features 406 and I3D features 407 from the audio signal 408 and the visual signal 409 from the audio and visual tracks of the video stream 405, respectively, where the audio signal 408 may be an audio waveform and the visual signal 409 may be a sequence of images. The frame rate for feature extraction may be different on each track. The encoder 402 encodes the VGGish 406 and I3D 407 feature vectors, where the sequences of audio and visual features from a starting point to the current time are fed to the encoder 402 and converted to hidden activation vector sequences through self-attention layers 410, bi-modal attention layers 411, and feed-forward layers 412. Typically, this encoder block 413 is repeated N times, e.g., N=6 or greater. The final hidden activation vector sequences are obtained via the N-th encoder block.

Let $X^A$ and $X^V$ be audio signal 408 and visual signal 409. First, the feature extractor 401 is applied to the input signals as $$A^0 = VGGish(X^A), \quad V^0 = I3D(X^V),$$

to obtain feature vector sequences corresponding to the VGGish 406 and I3D 407 features, respectively. Each encoder block 413 computes hidden vector sequences as $$\bar{A}^n = A^{n-1} + MHA(A^{n-1}, A^{n-1}, A^{n-1}),$$

$$\bar{V}^n = V^{n-1} + MHA(V^{n-1}, V^{n-1}, V^{n-1}),$$

$$\tilde{A}^n = \bar{A}^n + MHA(\bar{A}^n, \bar{V}^n, \bar{V}^n),$$

$$\tilde{V}^n = \bar{V}^n + \text{MHA}(\bar{V}^n, \bar{A}^n, \bar{A}^n),$$

$$A^n = \tilde{A}^n + \text{FFN}(\tilde{A}^n),$$

$$V^n = \tilde{V}^n + \text{FFN}(\tilde{V}^n),$$

where MHA( ) and FFN( ) denote a multi-head attention and a feed-forward network, respectively.

MHA( ) takes three matrices query Q, key K, and value V, each of which has the length times feature dimensions as $Q \in \mathbb{R}^{T_q \times d_k}$, $K \in \mathbb{R}^{T_k \times d_k}$, $V \in \mathbb{R}^{T_v \times d_v}$, and returns a matrix as $$\text{MHA}(Q,K,V) = \text{Concat}(\text{head}_1, \ldots, \text{head}_h) W^O$$

$$\text{head}_i = \text{Attention}(QW_i^Q, KW_i^K, VW_i^V)$$

$$\text{Attention}(Q, K, V) = \text{softmax}\left(\frac{QK^T}{\sqrt{d_k}}\right) V$$

where $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_v}$ and $W^O \in \mathbb{R}^{hd_v \times d_{model}}$ are parameter matrices of each multi-head attention layer, h is the number of heads, and $d_{model}$ is the model size. Concat( ) concatenates matrices in the feature dimension.

The feed-forward network FFN( ) is computed as $$\text{FFN}(x) = \max(0, xW_1 + b_1)W_2 + b_2,$$

where $W_1 \in \mathbb{R}^{d_k \times d_{ff}}$ and $W_2 \in \mathbb{R}^{d_{ff} \times d_k}$ are parameter matrices and $b_1 \in \mathbb{R}^{d_{ff}}$ and $b_2 \in \mathbb{R}^{d_k}$ are parameter vectors of each feed-forward layer.

The self-attention layer 410 extracts temporal dependency within each modality, where the arguments for MHA( ) are all same, i.e., $A^{n-1}$ or $V^{n-1}$. The bi-modal attention layers 411 further extract cross-modal dependency between audio and visual features, where they take the key and the value from the other modality. After that, the feed-forward layers 412 are applied in a point-wise manner. The encoded representations for audio and visual features are obtained as $A^N$ and $V^N$.

The timing-detection module 404 receives the encoded hidden vector sequences based on the audio-visual information available at the moment. The role of the timing-detection module 404 is to estimate whether the system should generate a caption or not for the given encoded features. The timing-detection module 404 first processes the encoded vector sequence from each modality with stacked 1D-convolution layers 414 as $$A_c = \text{Conv1D}(A^N), V_c = \text{Conv1D}(V^N).$$

Each time-convoluted sequences are then summarized into a single vector through pooling 415 and concatenation 416 operations.

$$H = \text{Concat}(\text{MeanPool}(A_c), \text{MeanPool}(V_c))$$

Feed-forward layer FFN( ) 417 and sigmoid function $\sigma$( ) 418 convert the summary vector to the probability of $\mathcal{D}$, where $\mathcal{D} \in \{0, 1\}$ is a random variable indicating whether a relevant caption can be generated or not.

$$P(\mathcal{D}=1|X^A,X^V) = \sigma(\text{FFN}(H))$$

$$P(\mathcal{D}=0|X^A,X^V) = 1 - P(\mathcal{D}=1|X^A,X^V)$$

Once the timing-detection module 404 provides a higher probability than a threshold, e.g., $P(d=1|X^A, X^V) > 0.5$, the decoder generates a caption based on the encoded hidden vector sequences $(A^N, V^N)$.

The decoder 403 iteratively predicts the next word from a starting word (<sos>). At each iteration step, the decoder receives the previously generated words 419, and estimate the posterior probability distribution of the next word 420 by applying word embedding 421, M decoder blocks 422, a linear layer 423, and a softmax operation 424.

Let $Y_i^0$ be partial caption <sos>, $y_1, \ldots, y_i$ after i iterations. Each decoder block 422 has self-attention 425, bi-modal source attention 426, concatenation 427, and feed-forward layer 428 as $$\bar{Y}_i^m = Y_i^{m-1} + \text{MHA}(Y_i^{m-1}, Y_i^{m-1}, Y_i^{m-1})$$

$$\bar{Y}_i^{Am} = \bar{Y}_i^m + \text{MHA}(\bar{Y}_i^m, A^N, A^N)$$

$$\bar{Y}_i^{Vm} = \bar{Y}_i^m + \text{MHA}(\bar{Y}_i^m, V^N, V^N)$$

$$\tilde{Y}_i^m = \text{Concat}(\bar{Y}_i^{Am}, \bar{Y}_i^{Vm})$$

$$Y_i^m = \tilde{Y}_i^m + \text{FFN}(\tilde{Y}_i^m).$$

The self-attention layer 425 converts the word embedding vectors to high-level representations considering their temporal dependency. The bi-modal source attention layers 426 update the word representations based on the relevance to the encoded multi-modal hidden vector sequences. The feed-forward layer 428 is then applied to the outputs of the bi-modal attention layers after concatenation 427. Finally, the linear transform 423 and the softmax operation 424 are applied to the output of the M-th decoder block to obtain the posterior probability distribution of the next word 420 as $$P(y_{i+1}|Y_i, A^N, V^N) = \text{Softmax}(\text{Linear}(Y_i^M))$$

$$\hat{y}_{i+1} = \underset{y \in \mathcal{V}}{\text{argmax}} P(y_{i+1} = y|Y_i, A^N, V^N),$$

where $\mathcal{V}$ denotes the vocabulary.

After picking the one-best word $\hat{y}_{i+1}$, the partial caption is extended by adding the selected word to the previous partial caption as $Y_{i+1} = Y_i, \hat{y}_{i+1}$. This is a greedy search process that ends if $\hat{y}_{i+1} = $<eos>, which represents an end word. The posterior probability distribution of caption $\mathcal{Y}$ can be computed as $$P(y|H) = \prod_{i=0}^{L: \hat{y}_{L+1} = <eos>} P(y_{i+1}|y_i, A^N, V^N)$$

where $H = (A^N, V^N)$.

It is also possible to pick multiple words with highest probabilities and consider multiple candidates of captions according to the beam search technique in the search module 306.

Training

The multi-modal encoder, the timing detector, and the caption decoder are jointly trained, so that the model achieves a caption quality comparable to that for a complete video, even if the given video is shorter than the original one by truncating the later part.

The training process for model $\theta = (\theta_C, \theta_D)$ repeats the following steps:
Sample $T_o \sim \text{Uniform}(T_s, T_e)$,
Compute loss $\mathcal{L} = \alpha \mathcal{L}_{CE} + \beta \mathcal{L}_{KL} + \gamma \mathcal{L}_D$,
Update $\theta$ using $\nabla_\theta \mathcal{L}$
Inference
The inference is performed in two steps:
Find t that first satisfies $P(\mathcal{D}=1|X_{s:t}; \theta_D) > F$, Generate a caption based on $$\hat{Y} = \underset{Y \in \mathcal{V}^*}{\mathrm{argmax}} P(y = Y | X_{s:t}; \theta_c),$$

Evaluation for Low-Latency Video Captioning Quality

Figure 5:
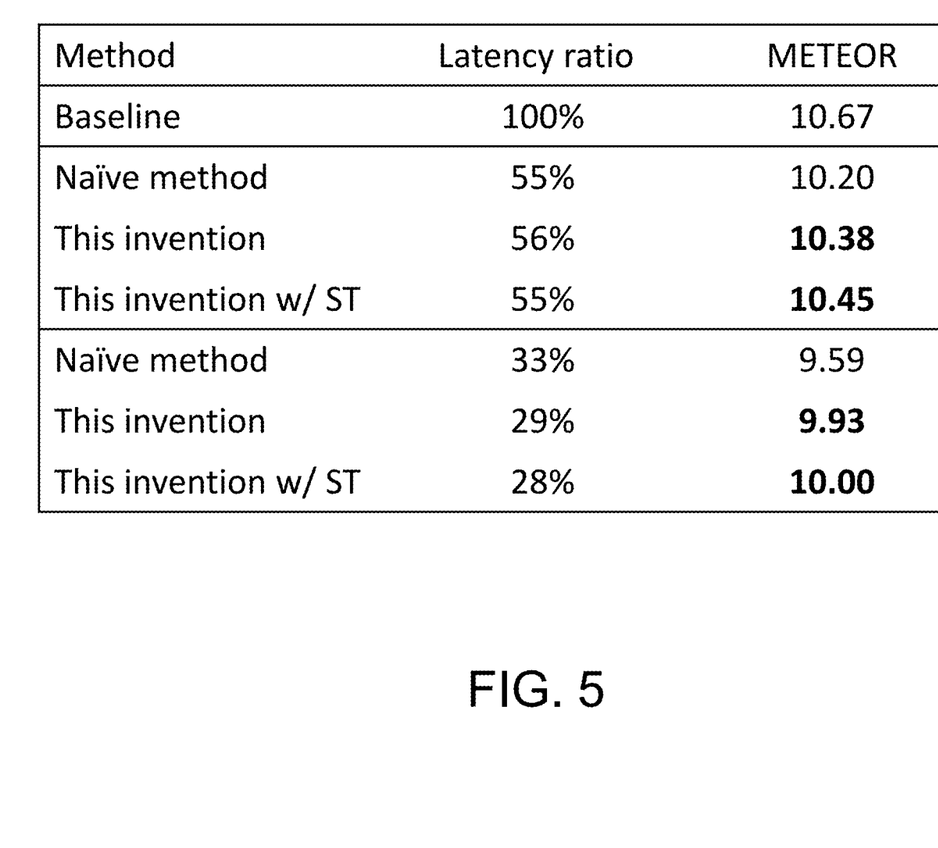
FIG. 5 is an evaluation result obtained by performing a low-latency video captioning test using an audio-visual Transformer built as a low-latency caption generator combined with a timing detector, according to embodiments of the present invention.

FIG. 5 is an evaluation result obtained by performing a video captioning bench marks, according to embodiments of the present invention;

The proposed low-latency caption generation was tested using the ActivityNet Captions dataset Krishna et al. (2017), which consists of 100 k caption sentences associated with temporal localization information based on 20 k YouTube videos. The dataset is split into 50%, 25%, and 25% for training, validation, and testing. The validation set was split into two subsets on which the performance was reported. The average duration of a video clip is 35.5, 37.7, and 40.2 seconds for the training set and the validation subsets 1 and 2, respectively. VGGish and I3D features were used. The VGGish features were configured to form a 128-dimensional vector sequence for the audio track of each video, where each audio frame corresponds to a 0.96 s segment without overlap. The I3D features were configured to form a 1024-dimensional vector sequence for the video track, where each visual frame corresponds to a 2.56 s segment without overlap.

A multi-modal Transformer was first trained with entire video clips and their ground-truth captions. This model was used as a baseline and teacher model. N=2 was used for encoder blocks and M=2 for decoder blocks, and the number of attention heads was 4. The vocabulary size was 10,172, and the dimension of word embedding vectors was 300.

The proposed model for online captioning was trained with incomplete video clips according to the steps in the invention. In the training process, $\alpha=\beta=\gamma=\frac{1}{3}$ was used for the loss function. The dimensions of hidden activations in audio and visual attention layers were 128 and 1024, respectively. The timing detector had 2 stacked 1D-convolution layers, with a ReLU non-linearity in between. The performance was measured by BLEU3, BLEU4, and METEOR scores.

The latency ratio indicates the ratio of the video duration used for captioning to the duration of the original video clip. With the baseline model, the latency ratio is always 1, which means all frames are used to generate captions.

FIG. 5 compares captioning methods in METEOR scores on validation subset 1. The model selected for evaluation was trained with S=0.6 (empirically decided) and had the best METEOR score on validation subset 2. The latency with the detection threshold F was controlled. As shown in FIG. 5, the proposed method at a 55% latency achieves 10.45 METEOR score with only a small degradation, which corresponds to 98% of the baseline score 10.67. It also achieves 10.00 METEOR score at a 28% latency, which corresponds to 94% of the baseline. A naive method was tested which takes video frames from the beginning with a fixed ratio to the original video length and runs the baseline captioning on the truncated video clip. The results show that the proposed approach clearly outperforms the naive method at an equivalent latency.

The table also includes the results using a unimodal Transformer that receives only the visual feature. The results show that the proposed method works for the visual feature only, but the performance is degraded due to the lack of the audio feature. This result indicates that the audio feature is essential even in the proposed low-latency method.

A low-latency caption is input into an interaction system trained using a pair of captions and action commands to understand scenes and decide next actions. The interaction system may use a sequence-to-sequence neural network model that converts a received caption to a sequence of words for responding to a human or a sequence of action commands to control robots.

We claim:

1. A scene captioning system comprising:
   an interface configured to acquire a stream of multimodal sensor signals using multimodal sensors to caption scenes;
   a memory to store a computer-executable scene captioning model including a multimodal sensor feature extractor, a multimodal sensor feature encoder, a timing detector, and a scene caption decoder, wherein the multimodal sensor feature encoder is shared by the timing detector and the scene caption decoder;
   a processor, in connection with the memory, configured to perform steps of:
      extracting multimodal sensor features from the multimodal sensor signals by use of the multimodal sensor feature extractor;
      encoding the multimodal sensor features by use of the multimodal sensor feature encoder;
      determining a timing of generating a scene caption by use of the timing detector, wherein the timing detector is trained to detect whether the current timing is appropriate or not, wherein the timing is arranged an early stage of the stream of the multimodal sensor signals; and
      generating the scene caption describing events based on the multimodal sensor features by using the scene caption decoder according to the timing.

2. The system of claim 1, wherein the multimodal sensor feature encoder and the timing detector are jointly pretrained.

3. The system of claim 1, wherein the scene caption is generated from an online and offline stream of multimodal sensor signals.

4. The system of claim 1, wherein the multimodal sensor feature encoder includes N encoder blocks and the scene caption decoder includes M decoder blocks.

5. The system of claim 1, wherein the scene is represented by multimodal sensor signals acquired by multimodal sensors.

6. The system of claim 1, wherein the timing detector includes an multimodal sensor feature encoder, wherein the multimodal sensor feature encoder encodes the future-eliminated feature vector sequence to a hidden activation vector sequence.

7. The system of claim 1, wherein an interaction system uses the generated scene caption to decide a next action of the interaction system, wherein the next action includes generating a sequence of words to respond to a human and/or generating a sequence of action commands to control robots.

8. A computer-executable training method for training a multimodal sensor feature encoder, a timing detector, and a scene caption decoder, comprising:
   providing a training dataset that includes a set of multimodal sensor signals and a set of groundtruth scene captions;
   converting the multimodal sensor signals to a feature vector sequence using a feature extractor;

eliminating future frames from the feature vector sequence using a future frame eliminator, wherein the future frame eliminator takes first feature vectors from the feature vector sequence and removes other feature vectors to generates a future-eliminated feature vector sequence;

encoding the future-eliminated feature vector sequence to a hidden activation vector sequence;

training a low-latency scene caption generator by computing a loss value computing a loss value based on a posterior probability distribution and the groundtruth scene captions;

training the timing detector by computing a supervision signal based on a scene caption similarity between a scene caption for the future-eliminated feature vector sequence and the groundtruth scene captions to detect whether the current timing is appropriate or not.

9. The method of claim 8, wherein the timing detector includes an encoder, wherein the encoder encodes the future-eliminated feature vector sequence to a hidden activation vector sequence.

10. A video captioning system comprising:
an interface configured to acquire a stream of audio-visual signals including image and sound data;
a memory to store a computer-executable video captioning model including an audio-visual feature extractor, an audio-visual feature encoder, a timing detector, and a video caption decoder, wherein the audio-visual encoder is shared by the timing decoder and the timing detector and the video caption decoder;
a processor, in connection with the memory, configured to perform steps of:
extracting audio and visual features from the audio-visual signals by use of the audio-visual extractor;
encoding the audio and visual features from the audio-visual signals by use of the audio-visual encoder;
determining a timing of generating a video caption by use of the timing detector, wherein the timing detector is trained to detect whether the current timing is appropriate or not, wherein the timing is arranged an early stage of the stream of the audio-visual signals; and
generating the video caption describing audio-visual scenes based on the audio and visual features by using the video caption decoder according to the timing.

11. The system of claim 10, wherein the audio-visual encoder and the timing detector are jointly pretrained.

12. The system of claim 10, wherein the video caption is generated from an online and offline stream of audio-visual signals.

13. The system of claim 10, wherein the audio-visual encoder includes N encoder blocks and the video caption decoder includes M decoder blocks.

14. The system of claim 10, wherein the audio-visual scene is represented by audio and/or visual signals acquired by audio-visual sensors.

15. The system of claim 10, wherein the timing detector includes an audio-visual feature encoder, wherein the audio-visual feature encoder encodes the future-eliminated feature vector sequence to a hidden activation vector sequence.

16. The system of claim 10, wherein an interaction system uses the generated video caption using audio-visual signals to decide a next action of the interaction system, wherein the next action includes generating a sequence of words to respond to a human and/or generating a sequence of action commands to control robots.

17. A scene captioning system comprising:
an interface configured to acquire a stream of signals using multimodal sensors to caption scenes;
a memory to store a computer-executable scene captioning model including a multimodal sensor feature extractor, a multimodal sensor feature encoder, a timing detector, and a scene caption decoder, a computer-executable training method of claim 8, wherein the multimodal sensor feature encoder is shared by the timing detector and the scene caption decoder;
a processor, in connection with the memory, configured to perform steps of:
extracting multimodal sensor features from the multimodal sensor signals by use of the multimodal sensor feature extractor;
encoding the multimodal sensor features by use of the multimodal sensor feature encoder;
determining a timing of generating a scene caption by use of the timing detector, wherein the timing detector is trained to detect whether the current timing is appropriate or not, wherein the timing is arranged an early stage of the stream of multimodal sensor signals; and
generating the scene caption describing events based on the multimodal sensor features by using the scene caption decoder according to the timing.

18. A video captioning system comprising:
an interface configured to acquire a stream of audio-visual signals including image and sound data;
a memory to store a computer-executable video captioning model including an audio-visual feature extractor, an audio-visual feature encoder, a timing detector, and a video caption decoder, a computer-executable training method of claim 8, wherein the audio-visual encoder is shared by the timing decoder and the timing detector and the video caption decoder;
a processor, in connection with the memory, configured to perform steps of:
extracting audio and visual features from the audio-visual signals by use of the audio-visual extractor;
encoding audio and visual features from the audio-visual signals by use of the audio-visual encoder;
determining a timing of generating a video caption by use of the timing detector, wherein the timing detector is trained to detect whether the current timing is appropriate or not, wherein the timing is arranged an early stage of the stream of the audio-visual signals; and
generating the video caption describing audio-visual scenes based on the audio and visual features by using the video caption decoder according to the timing.

* * * * *